Figure 7:
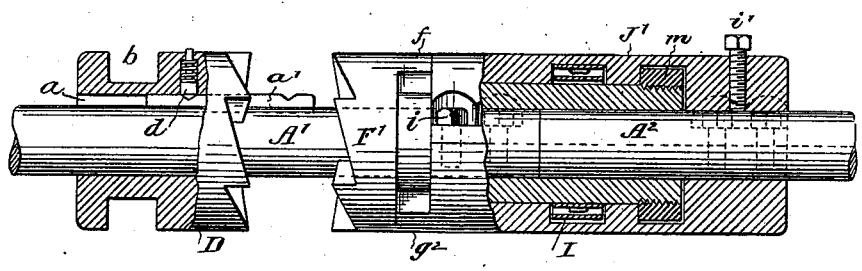

(No Model.) 2 Sheets—Sheet 1.
G. F. CLAMER.
CLUTCH AND COUPLING.
No. 539,249. Patented May 14, 1895.
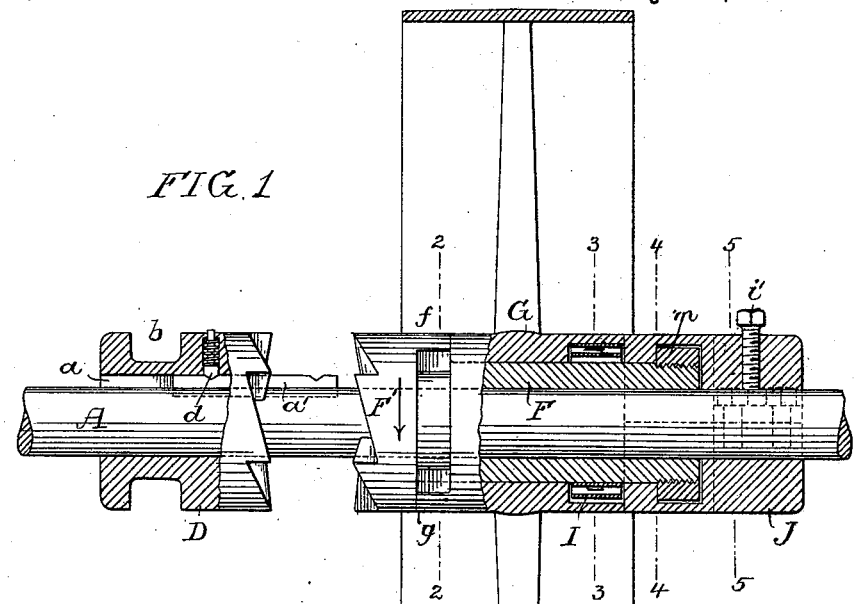
FIG. 1
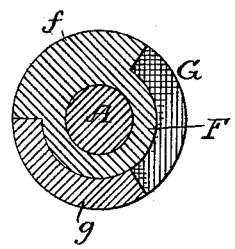
FIG. 2
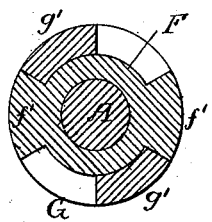
FIG. 6
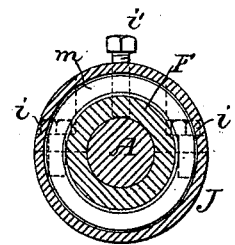
FIG. 4
FIG. 3
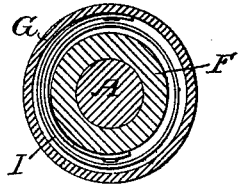
FIG. 5
Witnesses:
R. Schleicher
Will. A. Barr
Inventor:
George F. Clamer
by his Attorneys
Howson & Howson (No Model.)  2 Sheets—Sheet 2.

G. F. CLAMER.
CLUTCH AND COUPLING.

No. 539,249. Patented May 14, 1895.

Witnesses:
F. D. Goodwin
Murray C. Boyer

Inventor:
George F. Clamer
by his Attorneys
Howson & Howson

UNITED STATES PATENT OFFICE.

GEORGE F. CLAMER, OF PHILADELPHIA, PENNSYLVANIA.

CLUTCH AND COUPLING.

SPECIFICATION forming part of Letters Patent No. 539,249, dated May 14, 1895.

Application filed March 4, 1895. Serial No. 540,482. (No model.)

*To all whom it may concern:*

Be it known that I, GEORGE F. CLAMER, a citizen of the United States, residing in Philadelphia, Pennsylvania, have invented certain Improvements in Clutches and Couplings, of which the following is a specification.

The object of my invention is to so construct a positive clutch as to prevent sudden shock or jar when the clutch is first thrown into engagement, to prevent wear of the teeth of the clutch and to insure quick engagement of the teeth from root to point. This object I attain in the manner hereinafter set forth, reference being had to the accompanying drawings, in which—

Figure 1 is a longitudinal section, partly in elevation, of clutching mechanism constructed in accordance with my invention. Fig. 2 is a transverse section on the line 2 2, Fig. 1. Fig. 3 is a transverse section on the line 3 3, Fig. 1. Fig. 4 is a transverse section on the line 4 4, Fig. 1. Fig. 5 is a transverse section on the line 5 5, Fig. 1. Fig. 6 is a transverse section similar to Fig. 2, but illustrating a slight modification of the invention; and Fig. 7 is a longitudinal section, partly in elevation, illustrating the application of my invention to a shaft-coupling.

A represents the shaft and B the pulley, either of which may be the driven element of the device, the other being the part to be driven therefrom. On the shaft A is a clutch slide D having a groove $a$ for the reception of the usual spline $a'$ on the shaft, this clutch slide having the usual toothed front face and groove $b$ for the reception of the shipper fork. The slide also has a radial opening for the reception of a spring plug $d$, with beveled inner end adapted to enter either of two recesses formed in the spline $a'$, the plug entering the outer recess when the clutch slide is retracted, and entering the inner recess when said slide is projected.

Free to turn loosely on the shaft A is a sleeve F which has at one end a clutch head F' with toothed face adapted to engage with the toothed face of the clutch slide D and mounted on this sleeve is the hub G of the pulley B.

On the sleeve F, immediately back of the clutch head F', is formed a segmental lug $f$ and on the hub G of the pulley is formed a projecting segmental lug $g$, these lugs being best illustrated in Fig. 2, on reference to which it will be observed that each lug is in extent somewhat less than half a circle so that when one end of each lug is in contact with the other there will be between their opposite ends a space of considerable extent through which either lug may travel. The opposite end of the hub G is recessed to form a chamber for the reception of a coiled spring I the outer end of which is connected to the hub and the inner end of the sleeve F.

A split collar J is secured to the shaft A by means of clamp nuts $i$ and set screw $i'$, the inner end of this collar overlapping the end of the sleeve F and bearing against the end of the hub G and said overlapping portion having formed in it a recess for the reception of an annular nut $m$ screwed onto the end of the sleeve F. The collar thereby not only serves to hold the sleeve F in its proper longitudinal position on the shaft A but also retains the hub G and its lug $g$ in proper longitudinal relation to the sleeve F and its lug $f$. The tension of the spring I tends to maintain the lugs $f$ and $g$ in contact with each other as shown in Fig. 2, when the clutch is released.

Supposing that the shaft A is the driving element and that the pulley B has to transmit the power, the operation of the clutch is as follows: On the forward movement of the clutch slide D the sleeve F commences to turn as soon as the points of the teeth of the slide D and head F' engage with each other, but owing to the space between the lugs $f$ and $g$, this movement is not transmitted to the hub G of the fly wheel directly, but through the medium of the spring I, and if the load upon the pulley B is very heavy the first part of the movement of the sleeve F may be devoted entirely to winding up this spring, there being no movement of the pulley until the lugs $f$ and $g$ come into contact with each other, by which time the teeth of the two clutch parts have had an opportunity to come into full engagement so that no severe strain will be exerted upon the points of the teeth as would be the case if the full strain were brought upon the clutch when the teeth were only partly in engagement with each other. If the load upon the pulley is light the movement of the pulley may be started by the spring before the lugs $f$ and $g$ come into contact with each other. Hence instead of changing from a position of rest to one of movement at full speed the change may be effected more gradually and injurious shocks and strains thereby prevented. The provision of the beveled spring bolt $d$ and notched spline $a'$ insures a quick engagement of the teeth of the two clutch parts, as considerable force must be exerted in order to free the bolt from engagement with the rear notch. Hence the slide D, when it begins to move, is quickly thrust into engagement with the head F′, the engagement of the bolt with the inner recess of the spline serving to prevent accidental release of the clutch parts.

In some cases, the sleeve F and hub G may each have two lugs as shown for instance at $f'$ and $g'$ in Fig. 6, so as to distribute the strain upon the sleeve and hub.

I do not claim broadly the combination of a positive clutch with a lost motion connection between the same and the pulley and a spring through which power is applied to the pulley while this lost motion is being taken up, as this combination has before been proposed, nor do I limit my invention in its broadest embodiment to a clutch pulley, as it will be evident that said invention can be applied to a connecting and disconnecting shaft coupling by simply making the hub G a continuation of the collar J, the latter being secured to one shaft and the clutch slide D being carried by the other shaft. Such a construction is illustrated in Fig. 7, which shows a collar J′ extending forwardly over the sleeve F and provided with a lug $g^2$ for engaging with a lug $f$ on the head F′ of said sleeve, the collar being made in two parts clamped together in the same manner as the collar J and having two internal recesses, one for the reception of the nut $m$, and the other for the reception of the spring I. The two sections of the shaft are represented at A′ and A², the clutch sleeve D being splined to the shaft A′ and the collar J′ being secured to the shaft A², both shafts projecting part way into the sleeve F.

Having thus described my invention, I claim and desire to secure by Letters Patent—

1. The combination of a shaft or shafts with a clutch slide having a toothed face, a fixed collar, a loose sleeve having a toothed clutching head for engaging with the clutch slide, a hub on said sleeve, a coiled spring connecting the sleeve and hub, and lugs formed upon the sleeve and hub but providing a space through which either may travel before engaging with the other, such travel effecting a tightening of the spring connection between the sleeve and hub, substantially as specified.

2. The combination of a shaft or shafts, a clutch slide having a toothed face, a loose sleeve having a clutch head with toothed face for engaging with the clutch slide, a hub mounted on said sleeve, a coiled spring connecting the sleeve and hub, lugs formed upon the sleeve and hub and providing a space through which either may travel before engaging with the other, such travel effecting a tightening of the spring, a nut secured to the end of the sleeve, and a fixed collar engaging said nut and retaining the hub longitudinally in position on the sleeve, substantially as specified.

In testimony whereof I have signed my name to this specification in the presence of two subscribing witnesses.

GEORGE F. CLAMER.

Witnesses:
JAS. H. BANNARD,
FRANK E. BECHTOLD.